(12) United States Patent
Blossom (10) Patent No.: US 7,526,449 B1
(45) Date of Patent: Apr. 28, 2009

(54) OPTICALLY ENCODED CARD AND SYSTEM AND METHOD FOR USING

(75) Inventor: George Blossom, West Chester, PA (US)

(73) Assignee: JPMorgan Chase Bank N.A., New York, NY (US)

( * ) Notice: Subject to any disclaimer, the term of this patent is extended or adjusted under 35 U.S.C. 154(b) by 1768 days.

(21) Appl. No.: 09/835,314

(22) Filed: Apr. 17, 2001

(51) Int. Cl.
*G06Q 40/00* (2006.01)

(52) U.S. Cl. .............................. 705/41; 705/26; 705/65; 902/25

(58) Field of Classification Search .................. 705/16, 705/26–27, 35, 39–44, 64–67, 74–79; 902/22, 902/24–29; 725/6
See application file for complete search history.

(56) References Cited

U.S. PATENT DOCUMENTS

| | | | |
|---|---|---|---|
| 3,532,543 A | 10/1970 | Nole | |
| 3,546,022 A | 12/1970 | Busch | |
| 3,806,369 A | 4/1974 | Dey | |
| 4,482,985 A | 11/1984 | Itoh | |
| 4,523,297 A | 6/1985 | Ugon et al. | |
| 4,544,834 A | 10/1985 | Newport | |
| 4,582,985 A | 4/1986 | Lofberg | |
| 4,634,845 A | 1/1987 | Riley | |
| 4,689,478 A | 8/1987 | Hale | |
| 4,746,787 A | 5/1988 | Okada | |
| 4,750,036 A | 6/1988 | Martinez | |
| 4,754,418 A | 6/1988 | Hara | |
| 4,766,293 A | 8/1988 | Boston | |
| 4,825,052 A | 4/1989 | Ugon | |
| 4,833,048 A | 5/1989 | Dejonghe | |
| 4,859,837 A | 8/1989 | Halpern | |
| 4,868,376 A | 9/1989 | Lessin | |
| 4,897,533 A | 1/1990 | Lyszczarz | |
| 4,916,296 A | 4/1990 | Streck | |
| 4,922,111 A | 5/1990 | Kuwano | |
| 4,923,288 A | 5/1990 | Allen | |
| 4,968,873 A | 11/1990 | Dethloff et al. | |
| 4,977,455 A | 12/1990 | Young | |
| 4,999,617 A | 3/1991 | Uemura | |
| 5,025,373 A | 6/1991 | Keyser | |
| 5,047,614 A | 9/1991 | Bianco | |

(Continued)

OTHER PUBLICATIONS

"A Glossary of Computer Technology Terms", Oct. 25, 1989, American Banker, p. 10, vol. 154, No. 209.*

(Continued)

*Primary Examiner*—Mary Cheung
(74) *Attorney, Agent, or Firm*—Hunton & Williams LLP (57) ABSTRACT

A system is provided for facilitating computerized transactions. The system comprises an optically encoded personal information carrier. The carrier comprising a card readable in a CD-ROM drive. The card comprises optically encoded personal information related to a user, the personal information including an account number for one of a credit card and a debit card. A processing device comprises a CD-ROM drive for reading the optically encoded card, and a processor which may including browsing tools for allowing a user to view and select actions to be taken or items for purchase and transaction tools for allowing a user complete a selected transaction. Alternatively, the personal information carrier may include an optically encoded version of the browsing tools and the transaction tools.

34 Claims, 8 Drawing Sheets

U.S. PATENT DOCUMENTS

| | | | |
|---|---|---|---|
| 5,055,662 A | 10/1991 | Hasegawa | |
| 5,080,748 A | 1/1992 | Bonomi | |
| 5,097,115 A | 3/1992 | Ogasawara | |
| 5,154,731 A | 10/1992 | Winger | |
| 5,162,175 A | 11/1992 | Visco et al. | |
| 5,168,151 A | 12/1992 | Nara | |
| 5,173,589 A | 12/1992 | Diehl | |
| 5,227,614 A | 7/1993 | Danielson | |
| 5,233,654 A | 8/1993 | Harvey | |
| 5,241,161 A | 8/1993 | Zuta | |
| 5,247,190 A | 9/1993 | Friend | |
| 5,249,044 A | 9/1993 | Von Kohorn | |
| 5,252,815 A | 10/1993 | Pernet | |
| 5,276,311 A | 1/1994 | Hennige | |
| 5,285,278 A | 2/1994 | Holman | |
| 5,287,181 A | 2/1994 | Holman | |
| 5,317,137 A | 5/1994 | Wilkins | |
| 5,321,240 A | 6/1994 | Takahira | |
| 5,328,809 A | 7/1994 | Holmes | |
| 5,339,239 A | 8/1994 | Manabe et al. | |
| 5,340,969 A | 8/1994 | Cox | |
| 5,359,183 A | 10/1994 | Skodlar | |
| 5,396,650 A | 3/1995 | Terauchi | |
| 5,399,502 A | 3/1995 | Friend | |
| 5,401,827 A | 3/1995 | Holmes | |
| 5,412,192 A | 5/1995 | Hoss | |
| 5,479,494 A | 12/1995 | Clitherow | |
| 5,488,571 A | 1/1996 | Jacobs | |
| 5,504,664 A | 4/1996 | Ostema | |
| 5,506,394 A | 4/1996 | Plesko | |
| 5,508,731 A | 4/1996 | Kohorn | |
| 5,510,828 A | 4/1996 | Lutterbach | |
| 5,511,114 A | 4/1996 | Stimson | |
| 5,512,654 A | 4/1996 | Holmes | |
| 5,513,102 A | 4/1996 | Auriemma | |
| 5,516,598 A | 5/1996 | Visco et al. | |
| 5,521,363 A | 5/1996 | Tannenbaum | |
| 5,523,179 A | 6/1996 | Chu | |
| 5,523,794 A | 6/1996 | Mankovitz | |
| 5,530,235 A | 6/1996 | Stekfik | |
| 5,535,147 A | 7/1996 | Jacobs | |
| 5,544,246 A | 8/1996 | Mandelbaum | |
| 5,559,313 A | 9/1996 | Claus | |
| 5,563,948 A | 10/1996 | Diehl | |
| 5,568,441 A | 10/1996 | Sanemitsu | |
| 5,572,004 A | 11/1996 | Raimann | |
| 5,577,109 A | 11/1996 | Stimson | |
| 5,582,623 A | 12/1996 | Chu | |
| 5,585,787 A | 12/1996 | Wallerstein | |
| 5,590,038 A | 12/1996 | Pitroda | |
| 5,590,197 A * | 12/1996 | Chen et al. | 705/65 |
| 5,594,493 A | 1/1997 | Nemirofsky | |
| 5,604,542 A | 2/1997 | Dedrick | |
| 5,613,095 A | 3/1997 | Moss | |
| 5,621,787 A | 4/1997 | McKoy | |
| 5,629,977 A | 5/1997 | Fonseca | |
| 5,649,118 A | 7/1997 | Carlisle | |
| 5,652,602 A | 7/1997 | Fishman | |
| 5,663,766 A | 9/1997 | Sizer, II | |
| 5,664,110 A | 9/1997 | Green et al. | |
| 5,664,157 A | 9/1997 | Takahira | |
| 5,672,678 A | 9/1997 | Holmes | |
| 5,690,412 A | 11/1997 | Sheldon | |
| 5,710,458 A | 1/1998 | Iwasaki | |
| 5,721,781 A | 2/1998 | Deo | |
| 5,727,153 A | 3/1998 | Powell | |
| 5,728,998 A | 3/1998 | Novis et al. | |
| 5,734,154 A | 3/1998 | Jachimowicz | |
| 5,736,727 A | 4/1998 | Nakata | |
| 5,736,728 A | 4/1998 | Matsubara | |
| 5,744,789 A | 4/1998 | Kashi | |
| 5,751,953 A | 5/1998 | Sheils | |
| 5,760,381 A | 6/1998 | Stich | |
| 5,761,624 A | 6/1998 | Mooney | |
| 5,763,862 A | 6/1998 | Jachimowicz | |
| 5,767,896 A | 6/1998 | Nemirofsky | |
| 5,770,843 A | 6/1998 | Rose et al. | |
| 5,770,849 A | 6/1998 | Novis et al. | |
| 5,777,305 A | 7/1998 | Smith et al. | |
| 5,777,306 A | 7/1998 | Masuda | |
| 5,777,903 A | 7/1998 | Piosenka | |
| 5,778,067 A | 7/1998 | Jones et al. | |
| 5,789,732 A | 8/1998 | McMahon | |
| 5,789,733 A | 8/1998 | Jachimowicz et al. | |
| 5,804,806 A | 9/1998 | Haddad | |
| 5,806,044 A | 9/1998 | Powell | |
| 5,806,045 A | 9/1998 | Biorge | |
| 5,807,627 A | 9/1998 | Friend | |
| 5,815,127 A | 9/1998 | Jacobs | |
| 5,815,658 A | 9/1998 | Kuriyama | |
| 5,817,207 A | 10/1998 | Leighton | |
| 5,819,234 A | 10/1998 | Slavin et al. | |
| 5,853,498 A | 12/1998 | Beneking | |
| 5,854,595 A | 12/1998 | Williams | |
| 5,857,079 A | 1/1999 | Claus et al. | |
| 5,857,709 A | 1/1999 | Chock | |
| 5,859,419 A | 1/1999 | Wynn | |
| 5,870,155 A | 2/1999 | Erlin | |
| 5,880,769 A | 3/1999 | Nemirofsky | |
| 5,882,812 A | 3/1999 | Visco | |
| 5,884,271 A | 3/1999 | Pitroda | |
| 5,887,271 A | 3/1999 | Powell | |
| 5,890,135 A | 3/1999 | Powell | |
| 5,920,177 A | 7/1999 | Davis | |
| 5,920,844 A | 7/1999 | Hotta | |
| 5,921,263 A | 7/1999 | Negley | |
| 5,928,336 A | 7/1999 | Takeuchi | |
| 5,928,439 A | 7/1999 | Ota | |
| 5,930,217 A | 7/1999 | Kayanuma | |
| 5,932,994 A | 8/1999 | Jo | |
| 5,952,639 A | 9/1999 | Ohki | |
| 5,952,641 A | 9/1999 | Korshun | |
| 5,955,961 A | 9/1999 | Wallerstein | |
| 5,995,372 A | 11/1999 | Asakura | |
| 6,002,383 A | 12/1999 | Shimada | |
| 6,003,770 A | 12/1999 | Schilling | |
| 6,004,681 A | 12/1999 | Epstein | |
| 6,005,183 A | 12/1999 | Akai | |
| 6,006,775 A | 12/1999 | Negley | |
| 6,011,858 A * | 1/2000 | Stock et al. | 382/115 |
| 6,016,954 A | 1/2000 | Abe et al. | |
| 6,019,284 A | 2/2000 | Freeman | |
| 6,027,028 A | 2/2000 | Pieterse | |
| 6,030,720 A | 2/2000 | Chu | |
| 6,036,099 A | 3/2000 | Leighton | |
| 6,041,965 A | 3/2000 | Smith | |
| 6,045,042 A | 4/2000 | Ohno | |
| 6,049,463 A | 4/2000 | O'Malley | |
| 6,064,988 A * | 5/2000 | Thomas | 705/44 |
| 6,087,954 A | 7/2000 | McSpadden | |
| 6,089,284 A | 7/2000 | Kaehler | |
| 6,091,817 A | 7/2000 | Bertina | |
| 6,092,669 A | 7/2000 | Kushiya | |
| 6,095,412 A | 8/2000 | Bertina | |
| 6,107,562 A | 8/2000 | Hashimoto | |
| D431,037 S | 9/2000 | Wilson | |
| D431,039 S | 9/2000 | Wilson | |
| D431,252 S | 9/2000 | Wilson | |
| 6,124,545 A | 9/2000 | Bauer | |
| D431,573 S | 10/2000 | Wilson | |
| D432,141 S | 10/2000 | Wilson | |
| D432,548 S | 10/2000 | Wilson | |
| D432,552 S | 10/2000 | Wilson | |
| D433,031 S | 10/2000 | Wilson | |

| | | | |
|---|---|---|---|
| D433,032 S | 10/2000 | Wilson | |
| D433,033 S | 10/2000 | Wilson | |
| D433,034 S | 10/2000 | Wilson | |
| D433,035 S | 10/2000 | Wilson | |
| D433,036 S | 10/2000 | Wilson | |
| D433,037 S | 10/2000 | Wilson | |
| D433,059 S | 10/2000 | Okumura | |
| 6,128,599 A | 10/2000 | Walker et al. | |
| D433,420 S | 11/2000 | Wilson | |
| D433,421 S | 11/2000 | Wilson | |
| D433,422 S | 11/2000 | Wilson | |
| D433,423 S | 11/2000 | Wilson | |
| D433,424 S | 11/2000 | Wilson | |
| D434,041 S | 11/2000 | Burke | |
| 6,156,967 A | 12/2000 | Ralph | |
| 6,156,968 A | 12/2000 | Nishimoto | |
| 6,170,745 B1 | 1/2001 | Schilling | |
| D437,882 S | 2/2001 | Creighton | |
| 6,214,155 B1 | 4/2001 | Leighton | |
| 6,260,024 B1 * | 7/2001 | Shkedy | 705/37 |
| 6,308,887 B1 | 10/2001 | Korman et al. | |
| 6,318,536 B1 | 11/2001 | Korman | |
| 6,334,216 B1 * | 12/2001 | Barth | 725/30 |
| 6,441,736 B1 | 8/2002 | Leighton | |
| 6,514,367 B1 | 2/2003 | Leighton | |
| 6,549,912 B1 * | 4/2003 | Chen | 707/104.1 |
| 6,557,766 B1 | 5/2003 | Leighton | |
| 6,597,653 B1 | 7/2003 | Burnett | |
| 6,609,658 B1 * | 8/2003 | Sehr | 235/384 |
| D481,068 S | 10/2003 | Blossom et al. | |
| 6,631,849 B2 | 10/2003 | Blossom | |
| 6,725,303 B1 * | 4/2004 | Hoguta et al. | 710/106 |
| 6,957,334 B1 * | 10/2005 | Goldstein et al. | 713/170 |
| 6,965,868 B1 * | 11/2005 | Bednarek | 705/9 |
| 7,131,574 B1 * | 11/2006 | Sciupac et al. | 235/379 |
| 2001/0011250 A1 * | 8/2001 | Paltenghe et al. | 705/41 |
| 2001/0038033 A1 * | 11/2001 | Habib | 235/375 |
| 2002/0167890 A2 * | 11/2002 | Duroj | 369/273 |
| 2004/0049451 A1 | 3/2004 | Berardi | |

OTHER PUBLICATIONS

Press Release, BSI2000 Files Patent Application for Opitcal Bank Card, printed Apr. 27, 2004, BSI2000, 4 pages.
Epper, A Player Goes After Big Bucks in Cyberspace, American Banker, vol. 160, No. 86, ISSN: 0002-7561, May 5, 1995, p. 17.
Sotto, An RFID Code of Conduct, RFID Journal, Featured Opinions, May 30, 2005.
Brehl, Banks issue cash-card pledge, The Toronto Star, Oct. 9, 1997, 1 page.
Card Flash, Daily Payment Card News, www.CardWeb.com, printed Aug. 10, 2004.
Rosen, Cash Just Isn't Flexible Enough: Shops of the Future Will Only Take Cards, Daily Express, Technology Section, Feb. 10, 1995, 1 page.
Hesseldahl, China Goes Smartcard Crazy, www.forbes.com, Jun. 12, 2001.
Schwartz, Digital Cash Payoff.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.htm;, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Nokia Announces the World's First NFC Enabled Mobile Product for Contactless Payment and Ticketing, PRNewswire, Feb. 9, 2005.
Proton world and Europay to co-operate in creation of new CEPS-complaint e-purse application, Press Release 1999, Waterloo, Belgium, Jun. 28, 1999, 2 pages.
Purse Application for Cross Border Use in Euro, Cordis, Pace 1st 1999-11531 Pace, www.cordis.lu, printed Feb. 23, 2001, 3 pages.
RFID Tags, Contactless Smart Card Technology and Electronic Passports: Frequently Asked Questions, www.smartcardalliance.org, Feb. 17, 2005.
RFID Tags, Contactless Smart Card Technology: Comparing and Contrasting Applications and Capabilities, www.smartcardalliance.org, Feb. 17, 2005.
SK100 Smart Card Electronic Purse Balance Reader, SK100 Balance Reader, http://perso.wanadoo.fr, printed Feb. 23, 2001, 1 page.
Gilhooly, Smart Cards, Smart Move?, Computerworld, May 21, 2001, pp. 1-5.
Smart card for layalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Dvorak, Smartcards Get Smarter, www.forbes.com, Jun. 1, 2001.
Hesseldahl, Stock Focus: Smartcard Companies, www.forbes.com, Jun. 18, 2001.
The Electronic Purse Reaches the Car Park, http:\\docs.vircom.net/mobility/parking, printed Feb. 23, 2001, 2 pages.
Stuber, The electronic purse: An overview of recent development and issues, Bank of Canada, Technical Report No. 74, www.bankofcanada.ca, Jan. 1996, printed Feb. 23, 2001, 2 pages.
Transponders: Cash In A Flash, www.forbes.com, Jul. 31, 2001.
Hesseldahl, U.S. Getting Wise To Smart Cards, Forbes.com, May 25, 2000.
Understanding the benefits: Smartcity offers a number of important benefits to both the card issuers and their customers, http://www.icl.com/smartcards/benefits.htm, printed Feb. 27, 2001, 2 pages.
Visa first to launch electronic purse load via GSM mobile phone, www.cellular.co.za, Johannesburg, ZA, printed Feb. 23, 2001, 4 pages.
Hansell, Visa to unveil electronic purse cards, New York Times, printed Feb. 23, 2001, 2 pages.
Visa, MBNA and De La Rue Launch Multi-Function Smart Card Program, www.findarticles.com, Jul. 6, 1998.
Machlis et al., Will smart cards replace ATMS?, Computerworld, printed Feb. 23, 2001, 3 pages.
EnXnet, Inc., "Enxnet, Inc. Announces MoxyCard(R) Marketing Update", Jan. 25th Press Release, retrieved from the internet on Feb. 16, 2006, URL:<http://www.enxnet.com/html/jan25moxycardupdate.html.

* cited by examiner

OPTICALLY ENCODED CARD AND SYSTEM AND METHOD FOR USING

FIELD OF THE INVENTION

The present invention relates to an optically encoded card and a system and method for using the card and in particular to a system and method for using the card to assist a consumer with completing computerized transactions.

BACKGROUND OF THE INVENTION

Traditionally, cards used for consumer transactions have been credit or debit type cards that contain information on the face of the card and/or conventional magnetic stripe technology. More recently, smart card technology has been used to store additional information on a wallet sized card.

With the recent growth of e-commerce, consumers have become much more likely to conduct transactions, such as making purchases or paying bills, through the use of a computer rather than with conventional face-to-face transactions. Although software programs have been developed to assist with bill payment, purchasing, and other transactions, these software programs must be loaded on a computer in order for a user to implement them.

When making online purchases, consumers are typically required to manually enter a credit card number. This process is cumbersome and is commonly viewed as an unsecured transmission of information. Furthermore, smart card usage requires technology that is not typically available to the average merchant or computer user.

While smart cards and magnetic stripe cards do not require a consumer to manually enter a credit card number, these technologies require special reading devices for reading the information. These technologies also require separate loading of software on a device other than the card. Furthermore, conventional personal computers are not capable of reading either magnetic stripe cards or smart cards.

Accordingly, a need exists for a card that simplifies computerized purchasing, bill paying, and other transactions including online transactions. Additionally, a system and method for using the card are needed.

SUMMARY OF THE INVENTION

In accordance with the purposes of the invention as embodied and broadly described herein, there is provided a system for facilitating computerized transactions, the system comprising an optically encoded personal information carrier, the carrier comprising a card readable in an optical input/output device. The card comprises optically encoded personal information related to a user, the personal information could include info such as an account number for various transaction accounts, billing and shipping info, security keys, serial number, etc. The system additionally comprises a processing device comprising an optical input/output device for reading the optically encoded card, and a processor including software card browsing tools for allowing a user to view and select transaction choices and transaction and/or purchase tools for allowing a user to complete a selected transaction or purchase.

In another aspect, the invention comprises an optically encoded personal information carrier comprising a card readable in an optical input/output device such as a CD-ROM drive, the card comprising a plate and a hub around an axis of rotation of the card. Optically encoded information is provided on the card. The optically encoded information comprises personal information including an account number, installation and/or execution software and browsing tools enabling appropriate security measures and allowing a user to view and select transaction choices, and use transaction tools for the user to complete a transaction. When the carrier is inserted into the optical input/output device, a processor associated with the optical input/output device implements and/or installs the browsing tools and transaction tools enabling the user to complete a transaction.

In an additional aspect, the optically encoded information may or may not include personal information, and may be used in conjunction with personal, security, and/or other information that may be input by the user, may be stored elsewhere on the card, for example on a magnetic stripe or on a smart chip on the card, or may be stored elsewhere than the card, for example on another card or on the Internet or similar network, or on the user's processing device, such as a PDA, PC, cell phone.

In yet another aspect, the invention comprises an optically encoded personal information carrier. The carrier comprises a card readable in an optical input/output device such as a CD-ROM drive, the card comprising a plate and a hub around an axis of rotation of the card. The card additionally comprises optically encoded information, the optically encoded information comprising personal information including an account number, security keys, and/or other information and security measures. When the carrier is inserted into a processing device having transaction tools, the user is able to complete a transaction with the optically encoded personal information carrier.

In yet an additional aspect, the invention comprises a system for facilitating online transactions. The system comprises a personal information carrier comprising an optically encoded personal information card, which is optically encoded with an account number, security keys and other information and security measures. The system further comprises a processing device for receiving the personal information carrier and processing the optically encoded information. Merchants are connected with the processing device over a network, wherein the processing device directs the user to the merchants upon authenticating the security key. A database is connected with the processing device, wherein the processing device accesses the database to verify account information and permit transactions.

In yet an additional aspect, the invention comprises a method for conducting computerized transactions. The method comprises inserting an optically encoded personal information carrier in an optical input/output device such as a CD-ROM drive, the carrier comprising an optically encoded account number, security keys, and/or other info security measures. The method further comprises activating browsing tools enabling a user to browse for available products and services and select a particular transaction choice and activating transaction tools enabling a user to complete a transaction.

In another aspect, the carrier may be inserted into a CD-ROM, CD-I, CD-PROM, CD-RW, DVD, or other optical input/output device at the POS at a merchant or other location for purposes of enabling a purchase, financial, or other transaction.

In an additional aspect, the system enables the writing to as well as reading from the optically encoded card. Writing to the card enables the updating of software, tools, personal info, security measures, etc. as required to change or improve the functionality or security of the system.

These and other features, objects, and advantages of the preferred embodiments will become apparent when the detailed description of the preferred embodiments is read in conjunction with the drawings attached hereto.

DETAILED DESCRIPTION OF THE PREFERRED EMBODIMENTS

Reference will now be made in detail to the present preferred embodiments of the invention, examples of which are illustrated in the accompanying drawings in which like reference numerals refer to corresponding elements.

Figure 1:
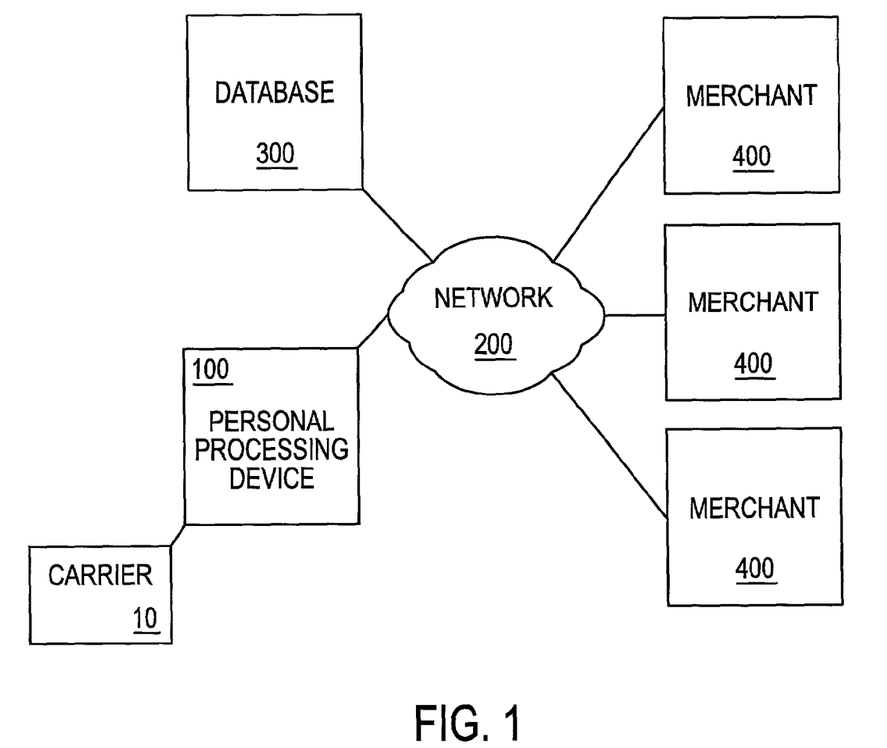
FIG. 1 is a block diagram illustrating an embodiment of a system for using an optically encoded card of the invention.

FIG. 1 is a block diagram illustrating a system according to an embodiment of the invention. An optically encoded information carrier 10 is inserted into a personal processing device 100. Through the use of the carrier 10 and the personal processing device 100, a user is connected over a network 200 with a plurality of merchants 400 including financial, service, and product firms. Optionally, the user may also be connected over a network with a database 300 for verifying credit. The database 300 could also be accessed by other known methods. The system may also exist without the use of the database 300.

The database 300 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

The network 200 preferably comprises the Internet. However, communication links between the personal processing device 100, the merchants 400, and the database 300 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. The communications link may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communication may also be accomplished by any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection.

Figure 2:
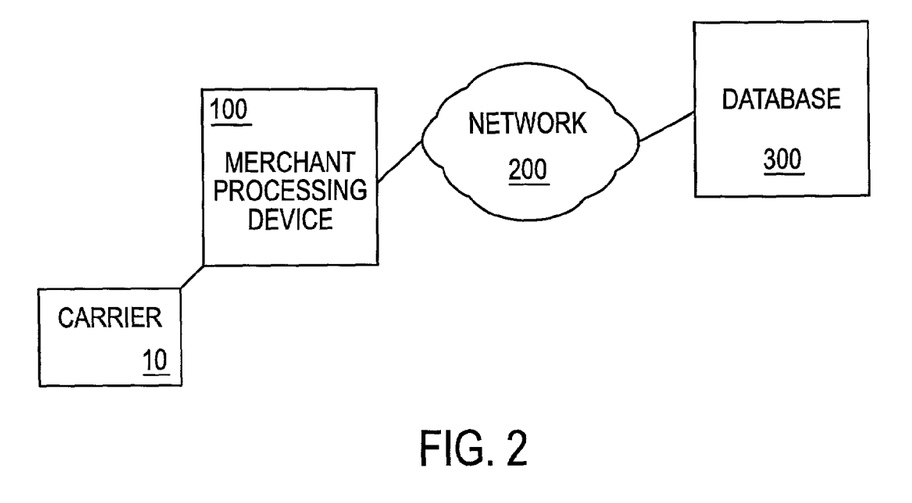
FIG. 2 is a block diagram illustrating an alternative embodiment of a system for using an optically encoded card of the invention.

FIG. 2 depicts an alternative embodiment in which an optically encoded personal information carrier 10 is inserted into a merchant processing device 100. The merchant processing device 100 may optionally connect over a network 200 with a database 300. In this embodiment, the merchant processing device may comprise a point of sale terminal at a merchant location.

Figure 3:
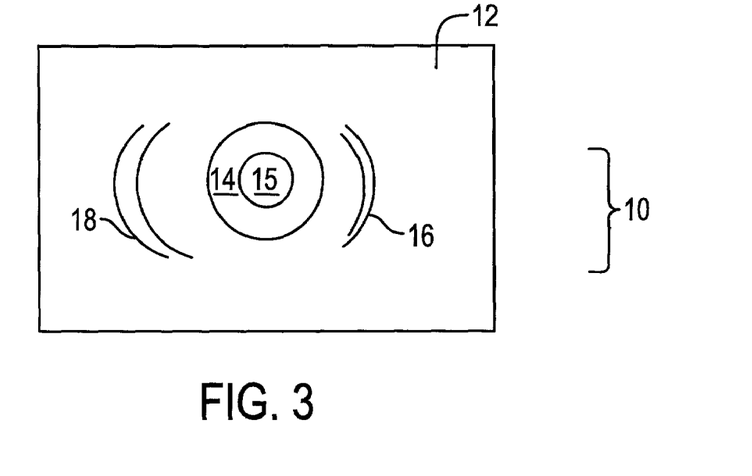
FIG. 3 is a top plan view illustrating components of an optically encoded card of an embodiment of the invention.

FIG. 3 illustrates a first embodiment of the personal information carrier 10. The carrier 10 is preferably a credit card sized object having a plate portion 12 and a hub portion 14. The hub portion 14 includes central portion 15 forming an axis of rotation for the carrier. The carrier 10 preferably includes optically encoded personal information 16. This optically encoded personal information 16 preferably includes an account number representing a debit card number, a credit card number, or a bank account number. Additional personal information may also be included such as shipping or billing information. Including such personal information on the carrier 10 would save the user the additional steps of entering billing and shipping information upon conducting a transaction, such as making a purchase or requesting services. Additionally, security information 18 may be optically encoded on the carrier 10. The security information 18 preferably must be matched to user input in order to confirm that the user is an authorized user. The security information may be implemented using any typical encryption methodology. One example is 3DES, but any known methodologies could be implemented. The area occupied by the optically encoded information may comprise much of the encodable card area or may only be provided in small arc segments.

Figure 4:
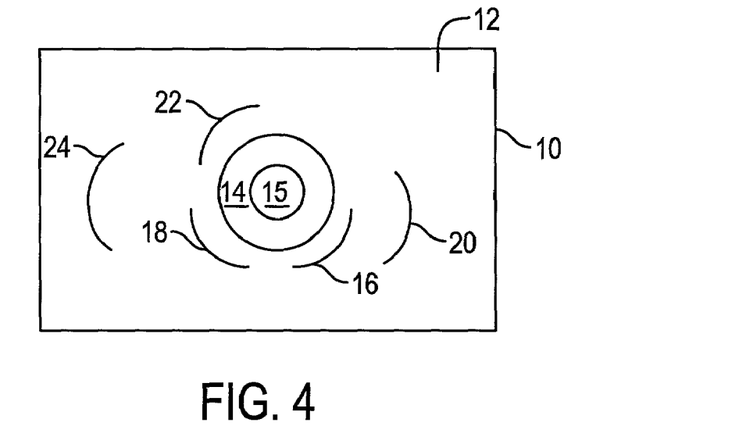
FIG. 4 is a top plan view illustrating an alternative embodiment of an optically encoded card of the invention.

A second embodiment of the optically encoded information carrier 10 is shown in FIG. 4. Again, the carrier 10 includes a plate portion 12 and a hub portion 14 including a central portion 15 which forms an axis of rotation. The optically encoded personal information 16 is substantially as described above with respect to FIG. 3. The optically encoded security information 18 is also substantially as described above with respect to FIG. 3. The embodiment of FIG. 4 further includes optically encoded security access tools 20, optically encoded browsing tools 22, and optically encoded transaction tools 24. The aforementioned tools operate as follows when inserted into an appropriate processing device, which will be further described below. The processing device must be equipped with or networked to a CD-ROM or similar optical input/output device, which will be further described below. The security access tools 20 act as a means for confirming the correspondence between user entered data and the security information 18. The browsing tools 22 act as a means for connecting the user with transaction choices such as items to be purchased and for allowing the user to select items. The transaction tools 24 act as a means for allowing the user to complete a transaction. The operation of the aforementioned tools is further described below in conjunction with FIGS. 10-13.

Generally speaking, the carrier 10 may be formed from any known optical storage medium that is insertable in an optical input/output device. The optical input/output device may be a CD-I, CD-ROM, CD-RW, DVD, or CD-PROM or any known device capable of reading/and or writing to the chosen optical storage medium.

Figure 5:
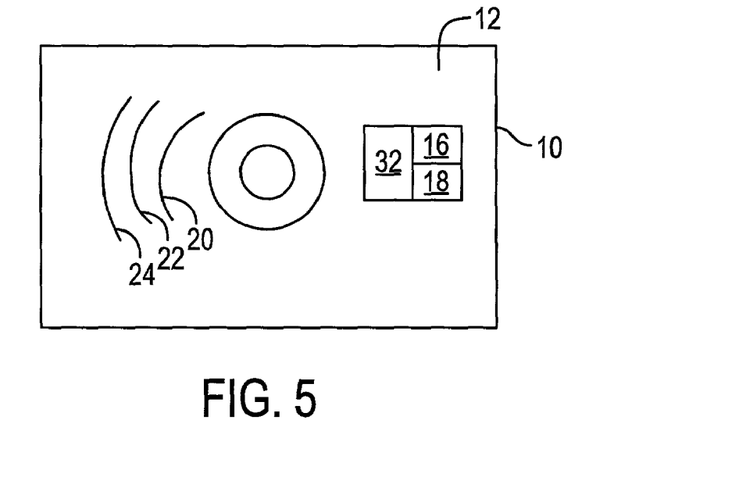
FIG. 5 is a top plan view illustrating an additional alternative embodiment of an optically encoded card of the invention.

FIG. 5 illustrates an alternative embodiment of the information carrier 10. In this embodiment, the security access tools 20, the browsing tools 22, and the transaction tools 24 are optically encoded with appropriate installation or execution software. Additionally a smart chip is provided, which includes personal information 16 and security information 18. In order to utilize the card 10 of FIG. 5, the processing device must be equipped with or networked to a CD-ROM device or similar input device and may require access to a smart card reader. Additionally, in a related embodiment, the personal and security information could be provided on a magnetic strip with the tools 20, 22, and 24 being optically encoded. In all of the embodiments shown in FIGS. 3-5, outwardly extending dimples (not shown) could be provided for securing a base of the carrier 10 into the CD-ROM drive. Such a securing mechanism could comprise three or four dimples each positioned a selected distance from the center of the carrier.

Figure 6:
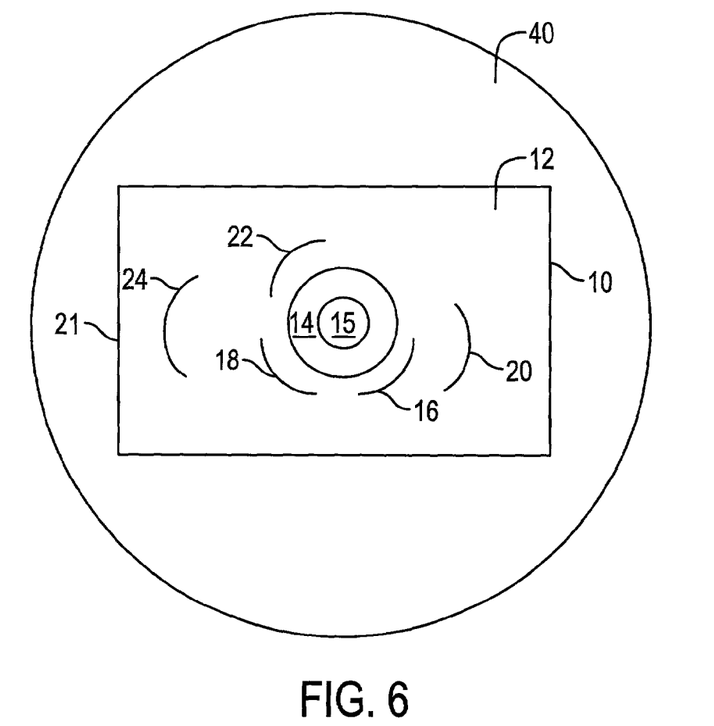
FIG. 6 is a top plan view illustrating an embodiment of an optically encoded card and card support assembly of the invention.

FIG. 6 illustrates an information carrier assembly 8. The assembly includes a carrier 10 and an intermediate support device 40. As in the embodiment of FIG. 4, the carrier 10 includes the plate portion 12 and hub portion 14 including a central portion 15 which forms an axis of rotation. The carrier 10 includes personal information 16, security information 18, optically encoded security access tools 20, optically encoded browsing tools 22, and optically encoded transaction tools 24. The assembly 8 further includes an intermediate support device 40. The intermediate support device shown is circular and is preferably the size of a standard CD-ROM. The support device provides a means for securing the carrier 10 in a CD-ROM drive. A card-shaped recess 21 may be provided for simple placement of the carrier 10. Any of the carriers 10 shown in FIGS. 3-5 could be used in the embodiment of FIG. 6.

Figure 7:
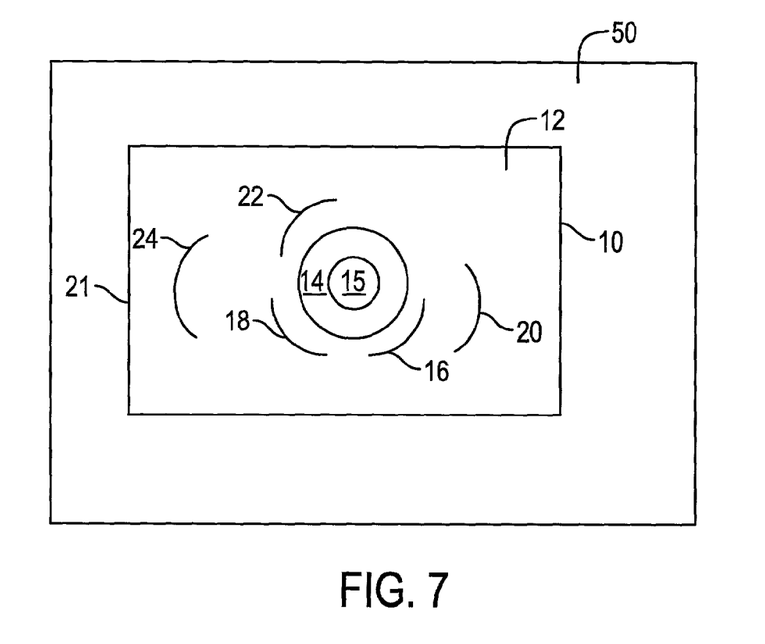
FIG. 7 is a top plan view illustrating an alternative embodiment of an optically encoded card and card support assembly of the invention.

FIG. 7 shows an alternative embodiment of the assembly 8. The card 10 is as shown in FIG. 5. However, an intermediate support assembly 50 is shown, which is substantially rectangular in shape.

Figure 8A:
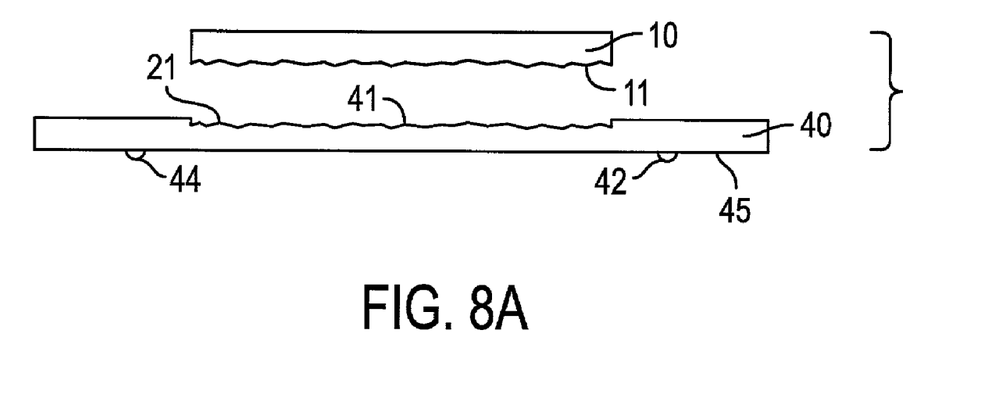
FIG. 8A is a cross sectional view illustrating an embodiment of an optically encoded card and card support assembly.
Figure 8B:
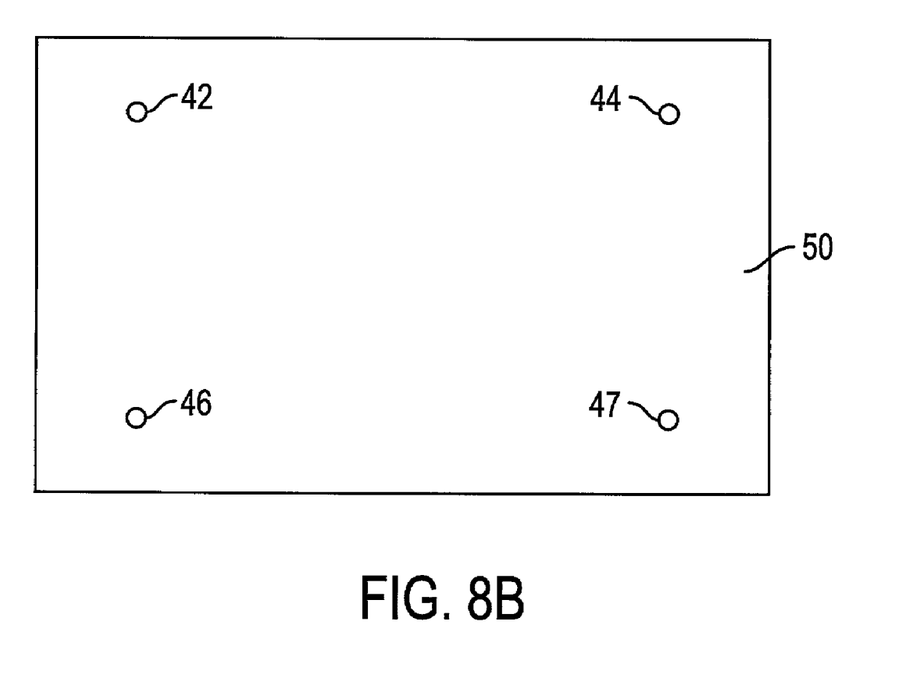
FIG. 8B is a bottom plan view of a card support assembly.

FIG. 8A illustrates a cross-sectional view of the carrier 10 being placed into the intermediate support assembly 40, 50. The intermediate support assembly 40, 50 comprises a recessed area 21. A bottom of the card 11 and a top of the recessed area 21 may be provided with matching grooves for a secure fit. A base 45 of the support assembly 40, 50 may be provided with a mechanism for placing the support assembly 40, 50 in the CD-ROM drive such as outwardly extending dimples 42 and 44 for fitting in a groove of the CD-ROM drive. Two additional dimples may also be provided symmetrically with respect to dimples 42 and 44 on an opposite side of the support assembly 40, 50. The additional dimples 46 and 47 are shown in FIG. 8B, which is a bottom plan view of a support assembly 50. Alternatively, any known securing mechanism may be used to secure the support assembly 40 to the CD-ROM drive.

The intermediate support assembly 40, 50 can be provided to ensure that the carrier 10 is held in place in the CD-ROM drive. The assembly 40, 50 can further provide a means for indexing the carrier 10 to the CD-ROM drive or other optical input/output device.

In all of the above-identified embodiments, the optically encoded information may be provided in a re-writable format, such that when new versions of the tools, 20, 22, and 24 are created, the tools could be rewritten or new tools added, rather than replacing the entire card. Furthermore, the personal information could also be rewritten or supplemented. This could be achieved any time the user changes or adds addresses for shipping and billing information and any time that a user changes or adds account parameters such as account numbers and pin numbers.

Figure 9:
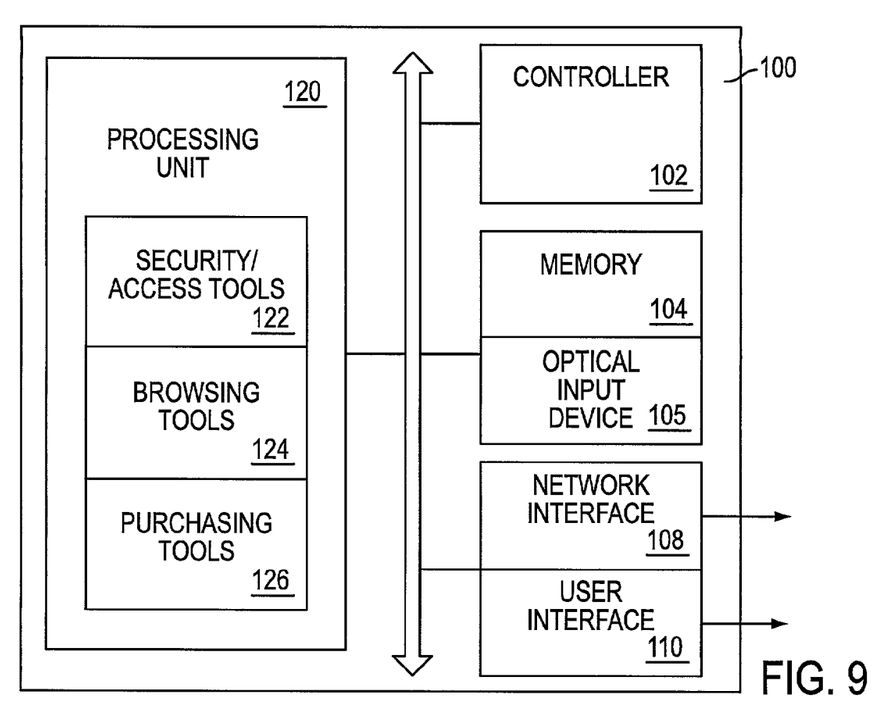
FIG. 9 is a block diagram illustrating a processing device of an embodiment of the invention.

FIG. 9 illustrates an embodiment of the processing device 100, which is to be used in connection with the personal information carrier 10 as shown in the embodiment of FIG. 3. The processing device 100 may include a controller 102, a memory 104, a network interface 108, a user interface 110, such as a mouse, monitor, or keypad, and a processing unit 120. The processing unit 120 is preferably programmed with security access tools 122, optically encoded browsing tools 124, and optically encoded transaction tools 126. The security access tools 122 act as a means for confirming the correspondence between user entered data and the security information 18. The browsing tools 124 act as a means for connecting the user with transaction choices, such items to be purchased, and allow the user to select items. The transaction tools 126 act as a means for allowing the user to complete a transaction, such as the purchase of a selected item. When using the personal information carrier shown in FIG. 4, which has its own optically encoded security access tools 20, browsing tools 22, and transaction tools 24, any standard personal computing device can be used as the processing device. It is likely the a processing device 100 such as that shown in FIG. 5 will be used as a merchant point of sale processing device.

Generally speaking, the processing device 100 may take any known form, such as a personal computer running the Microsoft Windows™ 95, 98, Millenium™, NT™, or 2000, WindowsTMCE™, PalmOS™, Unix, Linux, Solaris™, OS/2 ™, BeOS™, MacOS™ or other operating system or platform. The processing unit 120 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. The memory 104 may include electronic memory such as RAM (random access memory) or EPROM (electronically programmable read only memory), storage such as a harddrive, but must also include an optical input/output device 105 such as a CD-ROM drive or rewritable CD-ROM or any other optical input/output device. Other magnetic, optical or other media, and other associated components connected over an electronic bus may also be included, as will be appreciated by persons skilled in the art.

FIGS. 10-13 show the procedures implemented when the optically encoded personal information carrier 10 is inserted into the optical input/output device 105 of the processing device 100. These procedures may be performed regardless of the selected embodiments of the carrier 10 and processing device 100.

Figure 10:
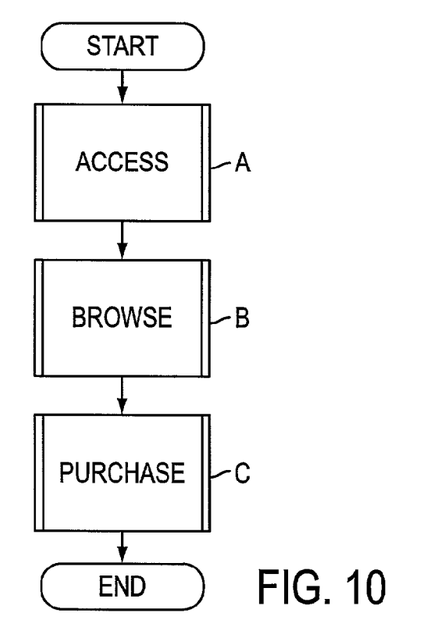
FIG. 10 is a flow chart illustrating the procedures performed by the system when a consumer uses the optically encoded card.

As shown in FIG. 10, the user obtains access in procedure A by inserting the personal information carrier 10 in the optical input/output device 105 of the processing device 100. Procedure A is further described in connection with FIG. 11 below. As shown in Procedure B, after gaining access, a user is able to browse and select items. Procedure B is further described below in connection with FIG. 12. Finally, in Procedure C, the user is able to use transaction tools 126 or 24 to complete a transaction such as the purchase of a selected item. Procedure C is further described below in connection with FIG. 13.

Figure 11:
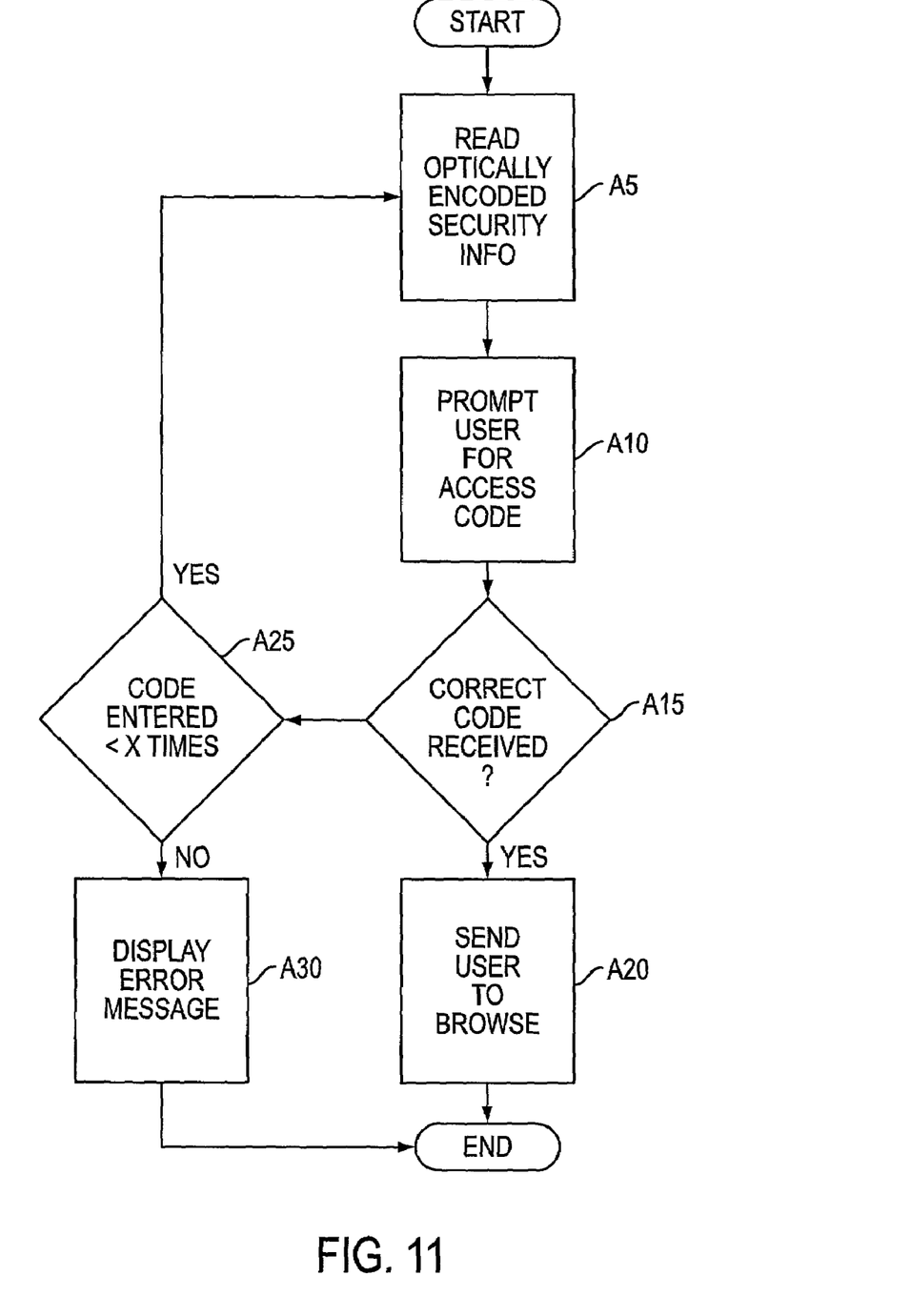
FIG. 11 is a flow chart illustrating a procedure for gaining access in accordance with an embodiment of the invention.

In Procedure A, the user gains access to the system. As shown in FIG. 11, in step A5, the user inserts the personal information carrier 10 into the optical input/output device 105 of the processing device 100 so that the optically encoded security information is processed. In step A10, the security/access tools 20 or 122 prompt the user for an access code and in step A15 determine if the correct code has been received. If the correct code has been received in step A15, the system sends the user to browse in step A20. If the correct code has not been received in step A15, the processing device 100 determines if the code has been entered less than a specified predetermined number of times. If the number of entries is below the predetermined limit, the user is able to enter the code again. Otherwise, an error message is displayed in step A30.

Figure 12:
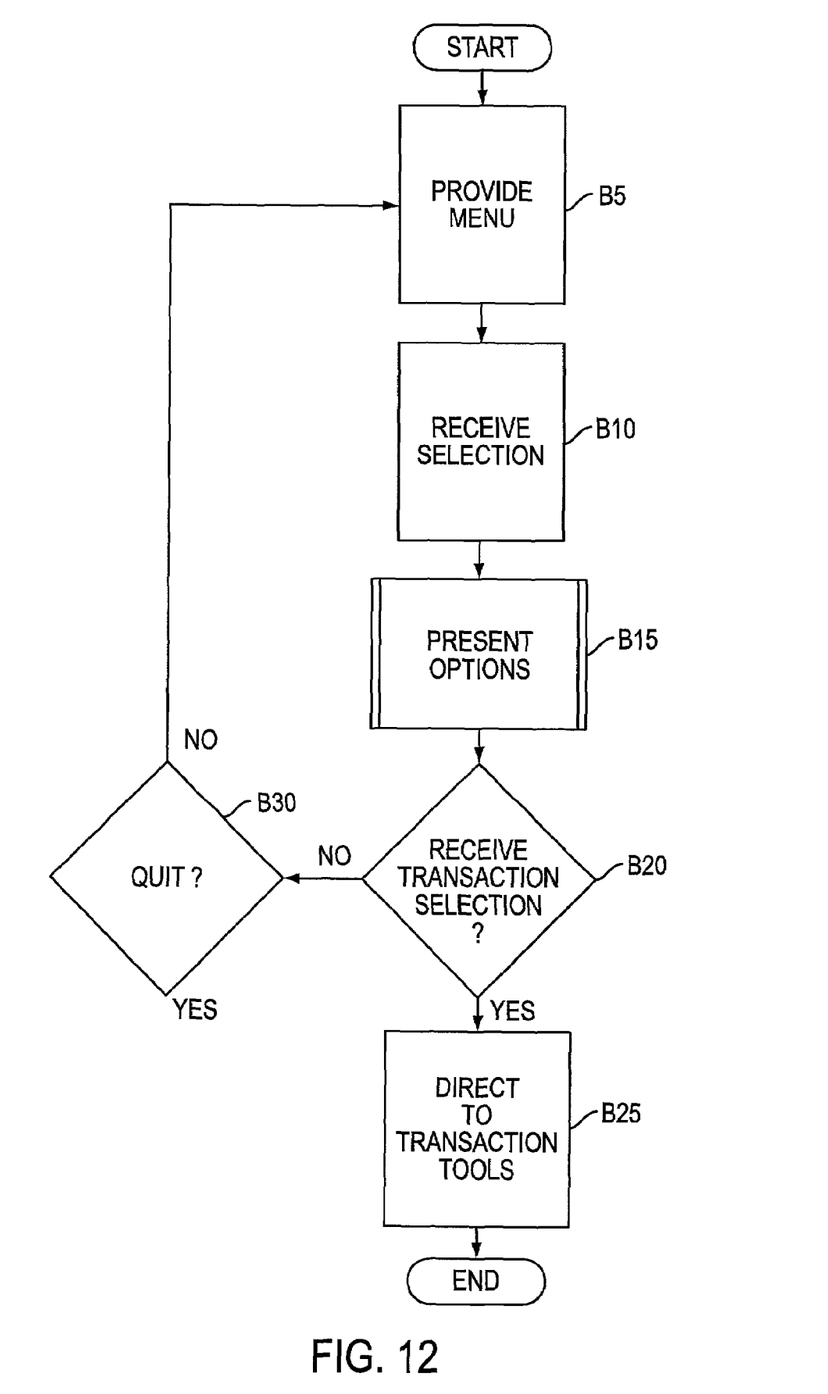
FIG. 12 is a flow chart illustrating a procedure for browsing in accordance with an embodiment of the invention.

FIG. 12 illustrates an embodiment of the browsing process B. In step B5, the user is provided with a menu. Depending upon the selected embodiment, the menu may comprise a list of merchants linked over the Internet, a list of product categories, or a list of available products and services. In step B10, the processing device 100 receives a selection from the user and in procedure B15, further options are presented to the user. Depending upon the particular embodiment of the invention, step B15 may bring the user to an Internet site, which will provide increasingly narrower lists of options. Alternatively, in B15 the user may be presented with increasingly narrow product lists, categories, or descriptions. In step B20, if a product selection has been received, the user is directed to transaction completion in step B25. If the selection has not been received, the user can quit in step B30 or repeat the entire process again.

Figure 13:
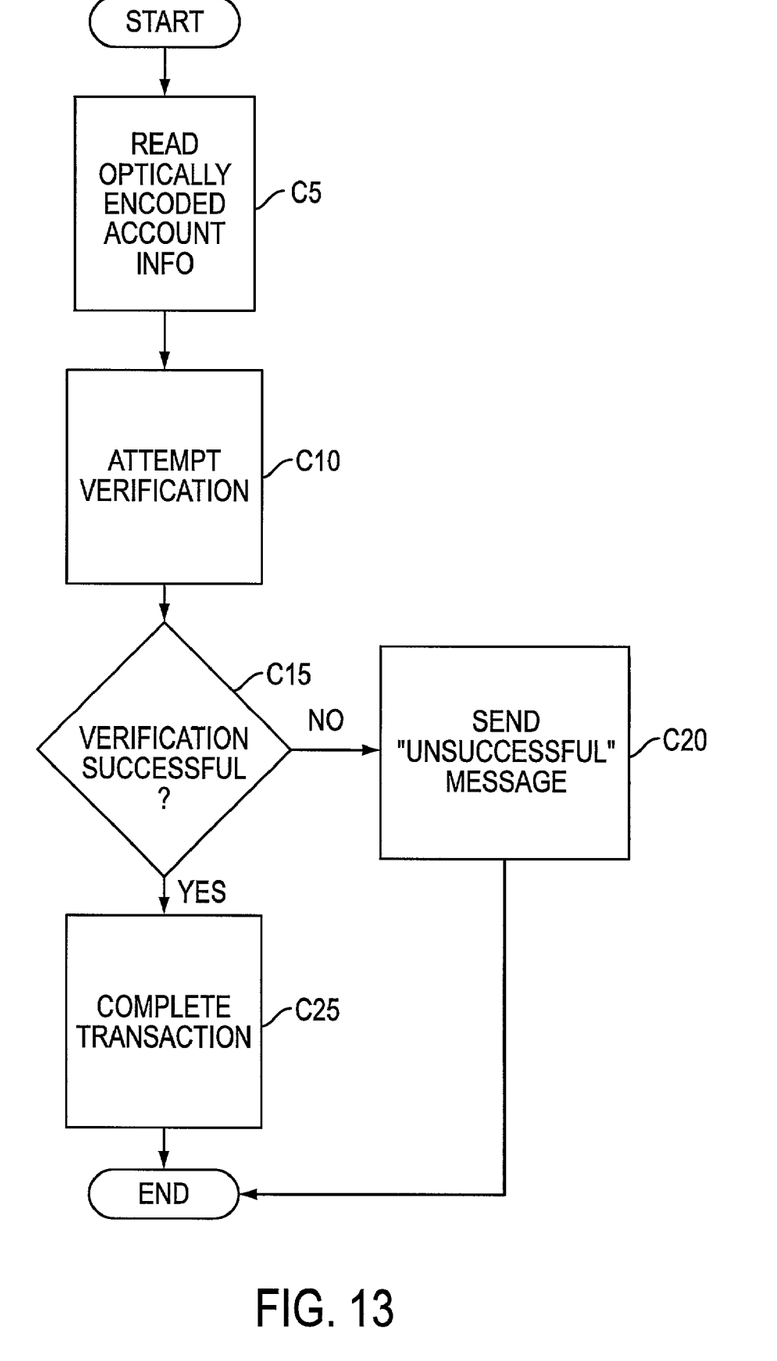
FIG. 13 is a flow chart illustrating a transaction completion procedure in accordance with an embodiment of the invention.

Assuming the user has selected a transaction, the user is directed to transaction completion in Procedure C as shown in FIG. 13. In step C5, the optical input/output device 105 reads the optically encoded account information. In step C10, the processing device 100 may attempt verification of account information by accessing a database 300. If verification is successful in step C15, the transaction is completed in step C25. If the verification is unsuccessful in step C15, a "verification unsuccessful" message is generated in step C20.

It will be apparent to those skilled in the art that various modifications and variations can be made in the system and process of the present invention without departing from the spirit and scope of the invention. Thus, it is intended that the present invention cover the modifications and variations provided they come within the scope of the appended claims and their equivalents.

What is claimed is:

1. A system for facilitating computerized transactions, the system comprising:
    an optically encoded personal information carrier, the carrier comprising a card readable in an optical input/output device, the card comprising optically encoded personal information related to a user, the personal information including an account number;
    a processing device comprising an optical input/output device for reading the optically encoded card; and
    a processor including browsing tools for allowing a user to view and select items associated with at least one merchant and transaction tools for allowing a user to complete a transaction with the at least one merchant, wherein a transaction utilizes at least a portion of the optically encoded personal information in conjunction with security information stored in an alternative medium on the optically encoded personal information carrier; wherein the user is granted access to the at least one merchant after the user is authenticated, and wherein an authentication process limits the user to a predetermined number of authentication attempts.

2. The system of claim 1, wherein the personal information comprises one of a credit account number, a debit account number, and a transaction account number.

3. The system of claim 1, wherein the personal information further comprises billing information and shipping information.

4. The system of claim 1, wherein the processing device further comprises network interface tools for interfacing the processing device with a plurality of product and service providers over a network.

5. The system of claim 1, further comprising means for accessing a database to verify credit information.

6. The system of claim 1, wherein the carrier further comprises optically encoded security information.

7. The system of claim 6, wherein the processing device comprises security tools for processing the security information.

8. The system of claim 1, wherein the processing device comprises a product or service providers' point of sale terminal.

9. The system of claim 1, wherein the processing device comprises a personal computer, a PDA, cell phone, or similar personal computing or communication device.

10. The system of claim 1, further comprising a securing mechanism on a side of the card in contact with the optical input/output device, the securing mechanism for securing the card in the optical input/output device.

11. The system of claim 1, further comprising an intermediate support assembly for supporting the card within the optical input/output device, the intermediate support assembly having a securing mechanism for attachment with the optical input/output device.

12. An optically encoded personal information carrier comprising:
    a card readable in an optical input/output device, the card comprising a plate and a hub around the axis of rotation of the card; and
    optically encoded information on the card, the optically encoded information comprising personal information including an account number, installation and/or execution software, security software, browsing tools, and transaction tools for allowing the user to complete a transaction, wherein when inserted into the optical input/output device, a processing unit associated with the optical input/output device implements the installation and/or execution software, security software, browsing tools for browsing the goods or services at least one merchant and the transaction tools, wherein the transaction utilizes at least a portion of the optically encoded personal information in conjunction with security information stored in an alternative medium on the optically encoded personal information carrier, wherein the user is granted access to the at least one merchant after the user is authenticated, and wherein an authentication process limits the user to a predetermined number of authentication attempts.

13. The system of claim 12, wherein the personal information comprises at least one of credit account numbers, debit account numbers, and transaction account numbers.

14. The system of claim 12, wherein the personal information further comprises billing information and shipping information.

15. The personal information carrier of claim 14, further comprising optically encoded security information.

16. The personal information carrier of claim 12, further comprising a securing mechanism on a side of the card in contact with the optical input/output device, the securing mechanism for securing the card in the optical input/output device.

17. The personal information carrier of claim 12, further comprising an intermediate support assembly for supporting the card within the optical input/output device, the intermediate support assembly having a securing mechanism for attachment with the optical input/output device.

18. An optically encoded personal information carrier comprising:
   a card readable in an optical input/output device, the card comprising a plate and a hub around an axis of rotation of the card; and
   optically encoded information on the card, the optically encoded information comprising personal information including an account number,
   wherein when the carrier is inserted in a processing device having transaction tools, the user is able to complete a transaction with at least one merchant with the optically encoded personal information carrier, wherein the transaction utilizes at least a portion of the optical encoded personal information in conjunction with security information stored in an alternative medium on the optically encoded personal information carrier; wherein the user is granted access to the at least one merchant after the user is authenticated, and wherein an authentication process limits the user to a predetermined number of authentication attempts.

19. The optically encoded personal information carrier of claim 18, wherein the personal information comprises at least one of a user's credit card account numbers, debit card account numbers, and transaction account numbers.

20. The optically encoded personal information carrier of claim 18, wherein the personal information comprises billing information and shipping information.

21. The optically encoded personal information carrier of claim 20, wherein the card further comprises optically encoded security information.

22. The optically encoded personal information carrier of claim 18, further comprising a securing mechanism on a side of the card in contact with the optical input/output device.

23. The optically encoded personal information carrier of claim 18, further comprising an intermediate support assembly for supporting the card within the optical input/output device, the intermediate support assembly having a securing mechanism for attachment with the optical input/output device.

24. An optically encoded information carrier comprising:
   a card readable in a processing device; and
   optically encoded information on the card comprising installation and/or execution software, security software, and browsing tools and/or transaction tools;
   wherein when inserted into the processing device, the installation and/or execution software, security software, and browsing tools and/or transaction tools are implemented to process a transaction with at least one merchant upon receipt of required personal information including at least one of an account number and security information, wherein the transaction utilizes at least a portion of the optically encoded personal information in conjunction with security information stored in an alternative medium on the optically encoded information carrier; wherein the user is granted access to the at least one merchant after the user is authenticated, and wherein an authentication process limits the user to a predetermined number of authentication attempts.

25. The optically encoded information carrier of claim 24, wherein at least some of the personal information is stored on the optically encoded card in an alternative location.

26. The optically encoded information carrier of claim 24, wherein the alternative location comprises at least one of a magnetic stripe and a smart chip.

27. The optically encoded information carrier of claim 24, wherein at least some of the personal information is input by a user.

28. The optically encoded information carrier of claim 24, further comprising a securing mechanism on a side of the card in contact with the optical input/output device, the securing mechanism for securing the card in the optical input/output device.

29. The optically encoded information carrier of claim 24, further comprising an intermediate support assembly for supporting the card within the optical input/output device, the intermediate support assembly having a securing mechanism for attachment with the optical input/output device.

30. An optically encoded personal information assembly comprising:
   a card readable in an optical input/output device, the card comprising a plate and a hub around an axis of rotation of the card;
   optically encoded information on the card, the optically encoded information comprising personal information including an account number and browsing and transaction tools for interacting with at least one merchant; and
   an intermediate support assembly positionable in direct contact with the optical input/output device and having a portion for supporting the card, wherein the transaction utilizes at least a portion of the optically encoded personal information in conjunction with security information stored in an alternative medium on the optically encoded personal information assembly; wherein the user is granted access to the at least one merchant after the user is authenticated, and wherein an authentication process limits the user to a predetermined number of authentication attempts.

31. The optically encoded personal information assembly of claim 30, wherein the optically encoded information comprises browsing tools for allowing a user to view and select items, and transaction tools for allowing the user to complete a transaction.

32. The optically encoded personal information assembly of claim 31, wherein the optically encoded information further comprises a security mechanism and security tools.

33. The optically encoded personal information assembly of claim 30, further comprising a securing mechanism on the base of the intermediate support assembly.

34. A system for facilitating computerized transactions, the system comprising:
- an optically encoded personal information carrier, the carrier comprising a card readable in an optical input/output device, the card comprising optically encoded personal information related to a user, the personal information including an account number;
- a processing device comprising an optical input/output device for reading the optically encoded card; and
- a processor, wherein the processor is configured to:
    - provide an interface for a user to view and select items associated with at least one merchant utilizing browsing tools on the optically encoded personal information carrier;
    - authenticate a user utilizing at least security tools on the optically encoded personal information carrier, wherein an authentication process limits the user to a predetermined number of authentication attempts;
    - grant the user access to the at least one merchant after the user is authenticated;
    - execute transaction tools on the optically encoded personal information carrier for allowing a user to complete a transaction with the at least one merchant, wherein the transaction utilizes at least a portion of the optically encoded personal information in conjunction with security information stored on the optically encoded personal information carrier, and wherein the credit of the user is verified with a remote database over a network prior to completion of the transaction.

* * * * *